United States Patent [19]
Fukuzaki

[11] Patent Number: 5,734,377
[45] Date of Patent: Mar. 31, 1998

[54] DATA MATCHING METHOD, COORDINATE INPUT METHOD, AND COORDINATE INPUT SYSTEM

[75] Inventor: Yasuhiro Fukuzaki, Saitama-ken, Japan

[73] Assignee: Wacom Co., Ltd., Saitama-ken, Japan

[21] Appl. No.: 388,265

[22] Filed: Feb. 13, 1995

[30] Foreign Application Priority Data

Mar. 11, 1994 [JP] Japan ................................ 6-067797

[51] Int. Cl.$^6$ ........................................................ G09G 5/00
[52] U.S. Cl. .......................... 345/173; 345/157; 345/179
[58] Field of Search ................................ 345/173, 179, 345/180, 181, 182, 183, 157, 156, 163, 167, 145, 146; 178/18, 19

[56] References Cited

U.S. PATENT DOCUMENTS

5,228,124  7/1993  Kaga et al. ............................ 345/179
5,349,139  9/1994  Verrier et al. ......................... 178/19

Primary Examiner—Regina Liang
Attorney, Agent, or Firm—Lowe, Price, LeBlanc & Becker

[57] ABSTRACT

Plural position pointing devices are used with software which is not designed for plural position pointing devices. A coordinate input system works with a coordinate detecting device having a multi-device function, which enables the device to detect the coordinate value of and switch information on each of a plural position pointing devices even when they are present on a single coordinate detecting surface at the same time. A tablet driver receives the information sent from the coordinate detecting device to a computer and hands it over to an application program. Determinations are made as to whether the switch information on the plural position pointing devices indicates ON. If all the switch information indicates OFF, all the information on the plural position pointing devices is mixed and handed over to the application program. If any of the switch information indicates ON, the information on only the position pointing device having ON switch information is handed over to the application program.

21 Claims, 10 Drawing Sheets

DATA MATCHING METHOD, COORDINATE INPUT METHOD, AND COORDINATE INPUT SYSTEM

BACKGROUND OF THE INVENTION

1. Field of the Invention

The present invention relates to a computer coordinate input system, i.e., a computer input system which works through cooperative operation of a coordinate input device functioning as a computer input device and a tablet driver which is software installed in the computer, and a coordinate input method whereby the input system transfers a coordinate value and the like to a computer application program and, more particularly, to a data matching method employed in a coordinate input system having a coordinate input device which is capable of simultaneously operating a plurality of position pointing devices present on a single position detecting surface.

2. Description of the Related Art

There are many known coordinate input devices called digitizers which are designed to determine the coordinate of a point, which is located on a position detecting surface, specified by an operator through a position pointing device and to send the data such as a coordinate value to a computer. Generally, the information received from the digitizer is processed in accordance with a program, namely, device driver software named the tablet driver installed in the computer and the processed information is transferred to the operating system (OS) or application program of the computer.

The applicant has proposed a coordinate input device which is capable of detecting data such as a coordinate value of each of a plurality of position pointing devices existing at the same time on a single position detecting surface of a coordinate input device. This coordinate input device disclosed in Japanese Patent Laid-Open No. 3-147012 is being sold under a trade name "UD Series."

For instance, most application software for drawing pictures has a menu area isolated from a drawing area. A picture drawing operation is carried out by selecting, for example, a drawing color from a menu given in the menu area, then by specifying a drawing position in the drawing area; this operation is repeated until the picture is completed. The drawing area and the menu area are usually, however, placed apart and the operator has to move the position pointing device back and forth over a considerable distance, leading to a fatiguing, inefficient operation.

The problem described above can be solved by using two position pointing devices so as to locate beforehand one position pointing device in a position in the menu area and the other in a position in the drawing area. Operating the two position pointing devices with both hands to work in the menu and drawing areas eliminates the need of moving the position pointing device over a considerable distance, thereby allowing an efficient and least fatiguing input environment to be achieved.

Thus, if a plurality of position pointing devices can be operated, then higher operating efficiency can be accomplished; however, the input device itself which enables the use of a plurality of position pointing devices is novel. Therefore, very few software currently available is designed to accept instructions from more than a single position pointing device.

Most software intended for a single position pointing device rather than a plurality of position pointing devices is designed to display a pointer in the position on the screen which corresponds to the position specified by the position pointing device.

Hence, by using a position detecting device equipped with a multi-device function for detecting a plurality of position pointing devices and making the position detecting device supply the information on the pointed position of each of the plurality of position pointing devices in sequence to the software designed for a single position pointing device, the software would be able to display in sequence the pointer in the positions corresponding to the plurality of position pointing devices. Naturally, the information transmitting mode used for this purpose must be the same one as that for the position detecting device having only one position pointing device for which the software is intended. There are the following methods available for deciding the timing of transmitting the information: a method wherein the information is one-sidedly sent out at particular time intervals; a method wherein the information is sent out in response to a request command received from the software; a method wherein the information is sent out when the position pointing device has moved by a certain distance, and a method which combines the methods described above. Very few other methods are used. In the case of the methods which involve the time intervals or the request command, the timings can be used as they are, while in the case of the method based on the moving distance, the information may be transmitted at appropriate time intervals based on the moving distances.

If it is possible to perform the switching and displaying mentioned above sufficiently fast, then it would appear to human eyes as if a plurality of pointers were displayed in the positions corresponding to the positions specified by a plurality of position pointing devices.

It may not possible, however, to achieve sufficiently quick switching because of a leveling process to eliminate a displacement in the coordinate position pointed by the position pointing device caused by a noise. Even this happens, however, the pointer which automatically moves from one pointed position to another would be at least visible.

Then, the button of the position pointing device is depressed to implement the operation which corresponds to the pointed position. For instance, depressing the button in the menu area causes the pointed menu to be executed.

Thus, if the information on the positions pointed by the plurality of position pointing devices is transmitted one after another and also the switch state information on the plurality of position pointing devices is transmitted one after another in synchronization with the coordinate information, then it would seem to the information receiver as if turning ON and OFF of the switch were repeated while the operator actually just keeps on depressing the switch of a single position pointing device. This would cause the software to successively repeat the same specified operation many times, presenting a problem. For example, in response to a command for opening a new window, many windows would undesirably be opened and displayed.

This problem may be solved as follows: when the button of one position pointing device is depressed, the successive transmission of the coordinate information is interrupted at that point and the coordinate information and the switch information on only the position pointing device with the button thereof depressed is transmitted.

According to an alternative method wherein a plurality of position pointing devices are employed in combination with the software which does not support the plurality of position pointing devices, a means is provided for selecting on which one of the plurality of position pointing devices the information should be transmitted, so that an optimum position pointing device is selected as necessary and the information thereon is transmitted.

In such a case where plural position pointing devices are used, it is conceivable that at least one position pointing device is assigned to each of both hands. Therefore, the means for selecting and specifying a particular position pointing device the information on which is to be transmitted should use the switches located on the position pointing devices for better efficiency. It is possible, for example, to use a separately connected keyboard as the selecting and specifying means. This, however, requires that the hands be released from the position pointing devices to operate the keyboard, making it meaningless to use a plurality of position pointing devices to begin with.

Hence, the buttons located on the position pointing devices are used for the selection of information, i.e., for switching the information. This undesirably causes the buttons to lose their originally intended function, namely, issuing instructions for operations to the software.

To avoid the problem described above, it is necessary to use the button of another position pointing device, i.e., the position pointing device assigned to the other hand; therefore, transmitted coordinate information and switch information may not necessarily come from the same position pointing device and the coordinate information needs to be selected separately from the switch information.

As another alternative, a plurality of buttons may be provided on each of the plural position pointing devices and one of the buttons may be used for selecting the position pointing device the information on which is to be transmitted. This requires, however, that two or more buttons on a single position pointing device be operated at the same time, and difficulties in operation may result depending on how the devices are held or at what angles they are held.

A button which works in two stages may be used to avoid the need of adding more buttons. Depressing the 2-stage button slightly selects a particular position pointing device and depressing it further issues an operation instruction to the software. It is of course needless to say that the position pointing device would be useless unless the position pointing device which is selected when the 2-stage button is depressed slightly is configured to become the position pointing device itself having that button; otherwise, the information would not be transmitted to anywhere even when the button is depressed further.

As still another alternative, a double button function is proposed.

Picture drawing software, computer aided design and the like involve a fairly large number of operations wherein two points are specified in succession. Such operations include drawing a straight line by specifying the start point and the end point in order, drawing a rectangle by specifying two diagonal points in order, and drawing a circle by specifying the central point and the points on the circumference in order.

Hence, when two position pointing devices are used, two points can be designated in advance and therefore, the buttons of two position pointing devices may be depressed in order. In this case, since two points have already been specified, it is possible to add a function for transmitting information in such a manner as if the buttons were depressed in two pointed positions while only one button is actually depressed. This function is called "double button function." This function is extremely convenient when many straight lines, rectangles, circles, etc. must be drawn in succession.

With the aid of the means described above, the operating efficiency can be improved when a plurality of position pointing devices are operated with the software which does not support plural position pointing devices. In recent years, the software referred to so far is frequently divided into two sections; one section is called a driver which receives information directly from an input unit and adds necessary processing to the received information and the other section is the application software for carrying out various types of processing.

The various functions discussed above are implemented in the position detecting device and they can also be implemented by the software named the driver. In that case, by improving only the driver software, the application software which does not support a plurality of position pointing devices can be used without adding any changes. There is another advantage; the format of information can be changed by the driver software and therefore, the position detecting device does not have to stick to an old information transmitting format, thus eliminating the need of the mode therefor.

When the driver software is employed, a pointer on a screen is often displayed by the driver. By improving this function, it may be possible to display a plurality of pointers at the same time. There are, however, some cases where the pointer display is performed by another driver for display.

In most applications, only the specified coordinate at the time the button is depressed is requested; therefore, only the information on the position pointing device the button of which has been depressed should be handed over to the application software, thereby avoiding the problem with the button operation in the position pointing device described above.

Although uncommon, there is application software which requests a pointed position in a state where no button has been depressed; however, such application software is used just temporarily when, for example, specifying two points, namely, the start and end points, to display a straight line. The application software is primarily used for displaying a line which follows a pointed position after the start point is designated, thus making it easier to specify the end point (this is called "elastic band display"). There should hardly be a problem as long as the end point is accurately specified. Further, in this case, no problem should be posed as long as the aforesaid double button function is used.

The data matching method in accordance with the present invention enables efficient input to application software for a single device by employing the coordinate detecting device equipped with the multi-device function.

SUMMARY OF THE INVENTION

Accordingly, an object of the present invention is to enable a plurality of position pointing devices to be used with software which is not designed for a plurality of position pointing devices.

To this end, according to one aspect of the present invention, there is provided a data matching method for determining whether the information on the switches of a plurality of position pointing devices indicates ON and transferring the mixed information on the plurality of position pointing devices to an application program if the information indicates that all switches are OFF, while, if any of the switch information indicates ON, transferring only the information on the position pointing device, the switch information on which indicates ON, to the application program in a coordinate input system which works through cooperative operation between a coordinate detecting device having a multi-device function, which enables the device to detect the coordinate value of and switch information on each of a plurality of position pointing devices simultaneously existing on a single coordinate detecting surface, and a tablet driver which receives the information sent from the coordinate detecting device to a computer and hands it over to the application program.

The above and other objects, features and advantages of the present invention will become clear from the following description when the same is read in conjunction with the accompanying drawings.

DESCRIPTION OF THE PREFERRED EMBODIMENTS

The embodiments of the present invention will now be described with reference to the accompanying drawings.

Figure 1:
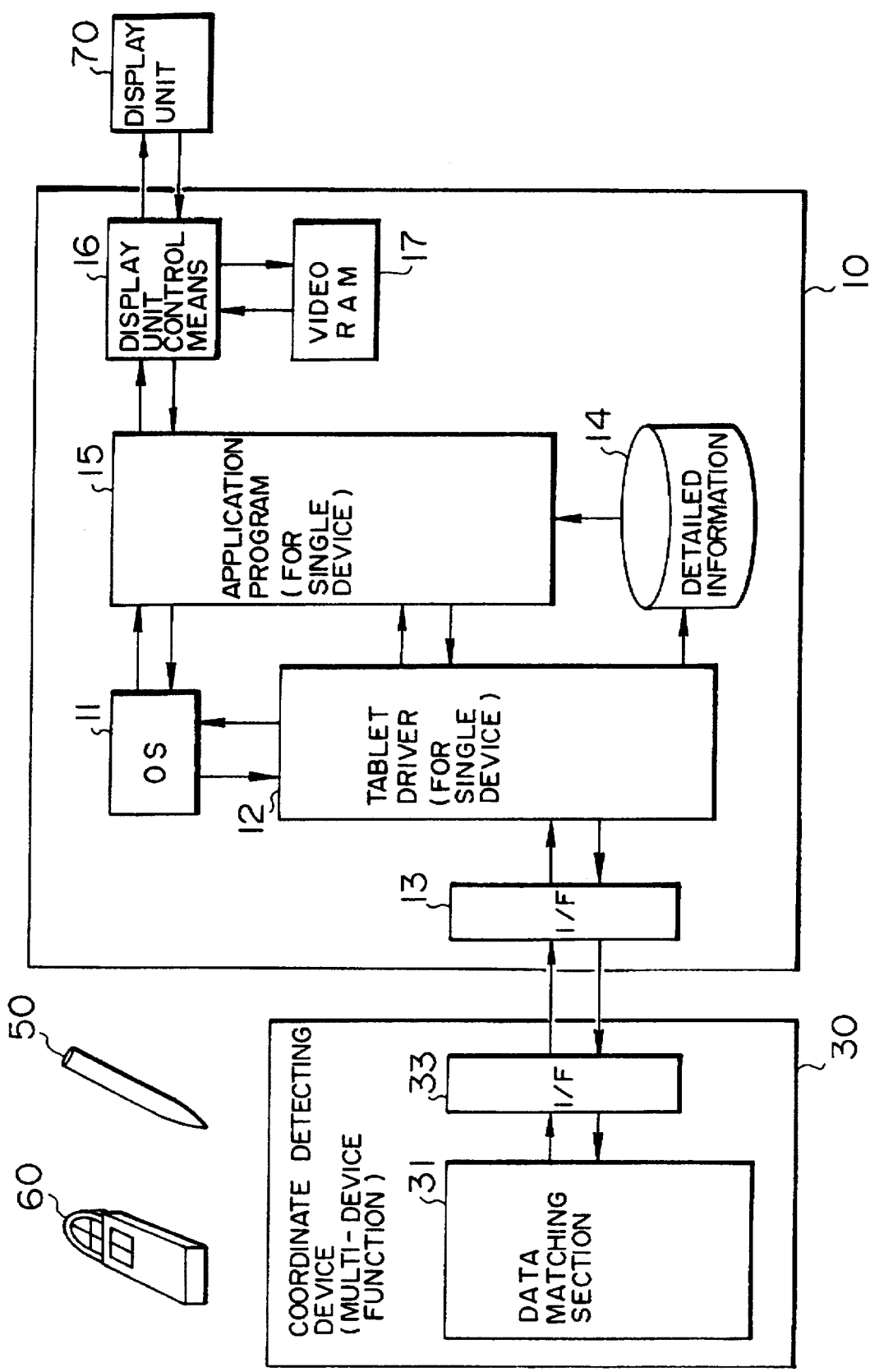
FIG. 1 is a block diagram illustrative of an embodiment wherein a characteristic section for embodying the coordinate input method according to the present invention is provided in the coordinate detecting device.

FIG. 1 shows the functional block diagram illustrative of the embodiment wherein the characteristic section for embodying the coordinate input method according to the present invention is provided in the coordinate detecting device. This functional block diagram refers to a diagram which schematically illustrates the functions implemented by the CPU of the computer reading various programs, i.e., the functions which are implemented by software means, by arranging the functions spatially in the same manner as that used for illustrating hardware-based implementing means. The same applies to like diagrams.

A computer 10 is an information processing apparatus such as a personal computer and a workstation; it has typical component units (not shown) including a CPU, buses connected to the CPU, and a necessary memory. Stored in the memory are mainly an operating system (OS) 11, a tablet driver 12, and an application program 15. The CPU implements the means by executing required programs in accordance with situations. A part of the processing of the application program 15 is shown on a display unit 70 primarily via a display unit control means 16 and a video RAM 17.

A coordinate detecting device 30 is a coordinate detecting device having the aforesaid multi-device function; it is capable of detecting the positions, i.e., the coordinate information, and the switch states (hereinafter referred to as "SW" or "SW information" as necessary) of a plurality of position pointing devices, namely, an electronic pen 50 and an electronic cursor 60 in this case although the number of devices is not limited to two, even when they are present on a position detecting surface at the same time. An example of the coordinate detecting device is the UD Series which is provided by the applicant and which is disclosed in Japanese Patent Laid-Open No. 3-147012.

The coordinate detecting device 30 and the computer 10 are connected via an interface (I/F) 33 of the coordinate detecting device and an interface 13 of the computer. In the configuration shown in FIG. 1, both the tablet driver 12 and the application program 15 are intended for a single device and they are designed to accept the coordinate and SW information of only one position pointing device. Hence, the SW information is related to the switch of that only one position pointing device; likewise, the coordinate information means the coordinate of that only one position pointing device. On the other hand, the coordinate detecting device is capable of dealing with multiple devices and therefore capable of detecting the coordinate information combined with the SW information of respective position pointing devices and transmitting them to the computer. For this reason, it is necessary to provide a data matching section somewhere in the system.

FIG. 1 shows an example wherein a data matching section 31 is provided in the coordinate detecting device 30. The data matching section 31 is configured to carry out required data matching through a microcomputer. The procedure which the data matching section 31 follows to implement the processing will be discussed later, referring to the flowchart. A typical recent coordinate detecting device carries out coordinate computation and the like by a CPU provided in the enclosure thereof. The functions of the data matching section 31 can be implemented by changing the program of the CPU in the coordinate detecting device, i.e., the firmware of a digitizer. Referring to FIG. 1, although the coordinate detecting device 30 has the multi-device function, the data format sent to the computer 10 via the data matching section 31 is identical to a single device format.

The operating system (OS) 11 shown in FIG. 1 is basic software such as MS-DOS and MS-WINDOWS (they are both trademarks of Microsoft Inc.). The application program 15 refers to a program such as a word processor, graphic processor (CAD), spreadsheet software, and database software. The tablet driver 12 is a so-called device driver provided for the user mainly by a manufacturer of the coordinate detecting device; it is a program installed in the computer 10 to transfer the coordinate information, SW information, and other detailed information from the coordinate detecting device to the OS 11 or the application program 15. This transfer includes not only the active transfer of data but also passive transfer for producing a state which enables the application program or the like to obtain the data. Since these three programs are software, it is possible to incorporate a part of their functions in other program. To be extreme, all the functions of the tablet driver could be included in the application program 15. In that case, the tablet driver 12 in FIG. 1 is considered to extract a portion corresponding to coordinate input signal processing or the like from the application program 15 and express it.

When an operator performs a coordinate input by operating the position pointing device, the operator visually checks the contents displayed on the screen of the display unit 70 shown in FIG. 1. The interactive input is primarily governed by the application program 15. Taking the pointing input in the graphic processor (CAD) as an example, if a pointed position is in a drawing area, then the application program 15 displays the pointer indicating the pointed position (e.g., a graphic shaped like a cross or arrow) on the screen. If the pointed position is in the menu display area, then the application program 15 highlights the pointed menu item by reversing, for example, the black and white in the case of a monochrome display unit or changing the color of the pointed area in the case of a color display unit. While observing the screen, the operator moves the position pointing device to select the desired point or menu item and when the desired position is reached, the operator turns ON the switch, namely, the pen pressure switch in the case of the electronic pen or the cursor button in the case of the electronic cursor. Upon receipt of a SW=ON signal, the application program 15 obtains the then coordinate value and uses it as necessary data, e.g., the coordinate value of an end point for drawing a rectangle, for executing an application.

Figure 2:
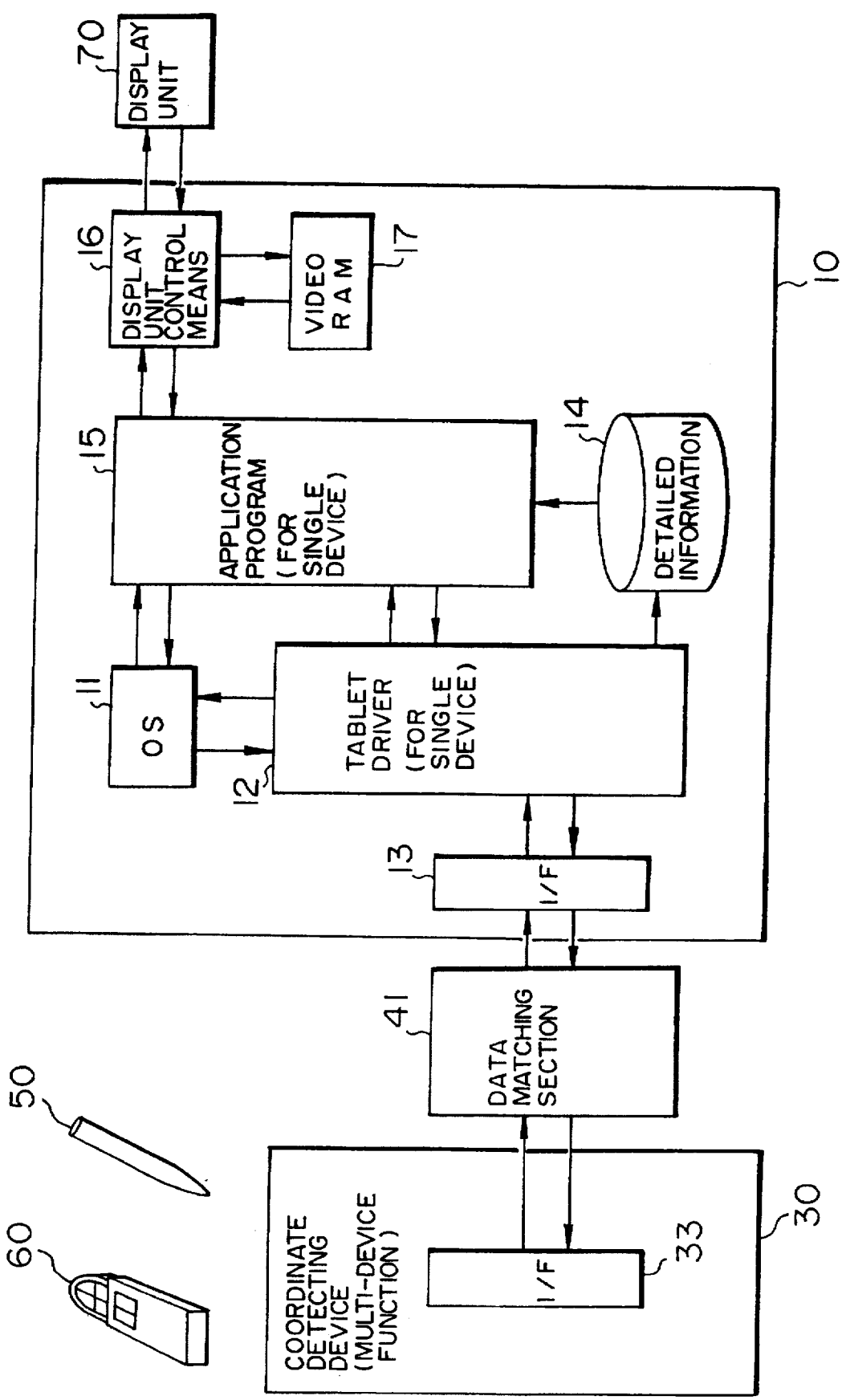
FIG. 2 is a functional block diagram illustrative of an embodiment wherein a characteristic section for embodying the coordinate input method according to the present invention is provided in an adaptor located between the coordinate detecting device and the computer.

FIG. 2 is the functional block diagram illustrative of the embodiment wherein the characteristic section for embodying the coordinate input method according to the present invention is provided in an adaptor located between the coordinate detecting device and the computer. This embodiment is different from the embodiment shown in FIG. 1 in that the data matching section 31 in FIG. 1 is provided as a data matching section 41 between the interface 13 and the interface 33 rather than inside the coordinate detecting device 30. Such an adaptor can be achieved by providing necessary circuits including microcomputers in the enclosure of the computer 10 and the enclosure of the coordinate detecting device 30, respectively. In the embodiment of FIG. 2, the data transmitted from the coordinate detecting device 30 to the data matching section 41 is the information related to the multi-device format, i.e., the information related to a plurality of coordinates and a plurality of SW information. The data format issued from the data matching section 41 and handed to the tablet driver 12 via the interface 13 is identical to the single device format.

The adaptor may be anywhere as long as it is located between the two interfaces; therefore, it may be designed to be in close contact with either of the two interfaces. Another modified embodiment is conceivable, wherein an interface board to be inserted in an extension slot of the computer 10 is made and the interface board is provided with a circuit which has both the interface 13 and the data matching section 41.

Figure 3:
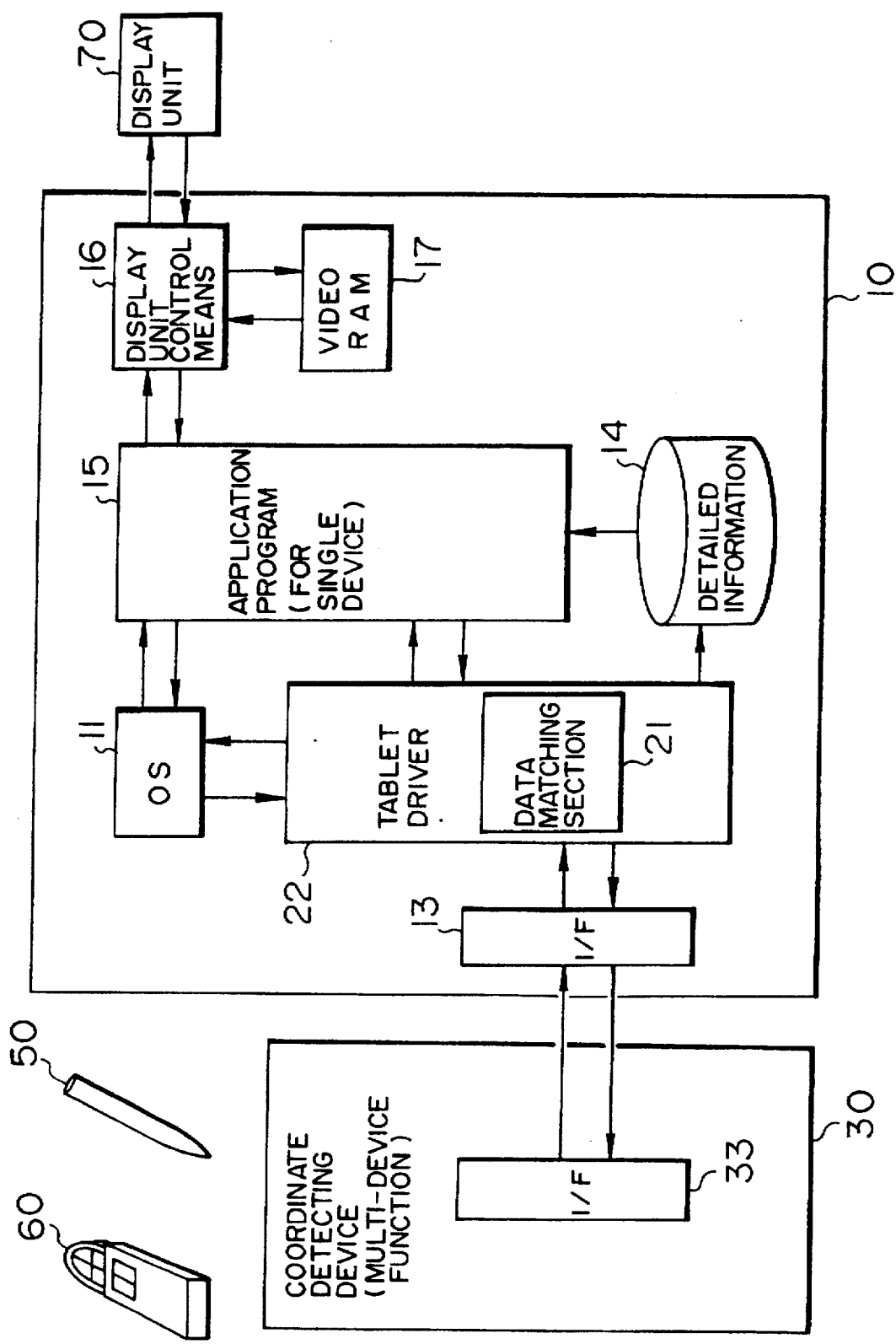
FIG. 3 is a functional block diagram illustrative of an embodiment wherein a characteristic section for embodying the coordinate input method according to the present invention is provided in the tablet driver in the computer.

FIG. 3 is the functional block diagram illustrative of the embodiment wherein the characteristic section for embodying the coordinate input method according to the present invention is provided in the tablet driver located inside the computer. This embodiment shown in FIG. 3 is different from the embodiment shown in FIG. 1 or FIG. 2 in that the data matching section 21 is implemented like software as a program installed in the computer 10. In the embodiment of FIG. 3, the data transferred from the coordinate detecting device 30 to the tablet driver 22 via the two interfaces has the multi-device format. The information handed from the tablet driver 22 to the application program 15 has the single device format.

An embodiment of the data matching process implemented by the data matching section 31, 41 or 21 will now be described with reference to FIG. 4 and after. The processing performed by the data matching section 31 may be regarded as a firmware program of the coordinate detecting device 30; the processing executed by the data matching section 41 may be regarded as a program of the microcomputer provided in the adaptor; and the processing carried out by the data matching section 21 may be regarded as a program executed by the computer 10. Hence, all the processing is characterized as program procedures and commonly shown by the flowcharts given in FIG. 4, FIG. 6, FIG. 8, and FIG. 9. The programs characterizing the data matching sections 31 and 41 are frequently provided in the form of ROM chips, while the program characterizing the data matching section 21 is frequently provided in a floppy disk.

The following describes four modes; a basic mode (FIG. 4), an information switching mode (FIG. 6), a 2-stage SW mode (FIG. 8), and a double button mode (FIG. 9) which are all independent. In the case of the data matching section 31, the mode is switched by a hardware-based switching means such as a DIP switch at the start of operating the coordinate detecting device or by a software-based switching means using a menu sheet or the like combined with the operation of the position pointing device. In the case of the data matching section 41, the mode is switched by a hardware switch provided on the adaptor thereof, for example. In the case of the data matching section 21, the mode can be switched by providing the tablet driver with a program which enables the operator to select the desired mode through an interactive processing typically represented by an environment setting menu. This makes it possible to switch the mode in accordance with operator's needs. Further, if the tablet driver is installed by describing the so-called device line in the file which corresponds to "CONFIG. SYS" when the OS is MS-DOS, then the mode switching can be performed by describing it as an option switch at the time of start-up.

Figure 4:
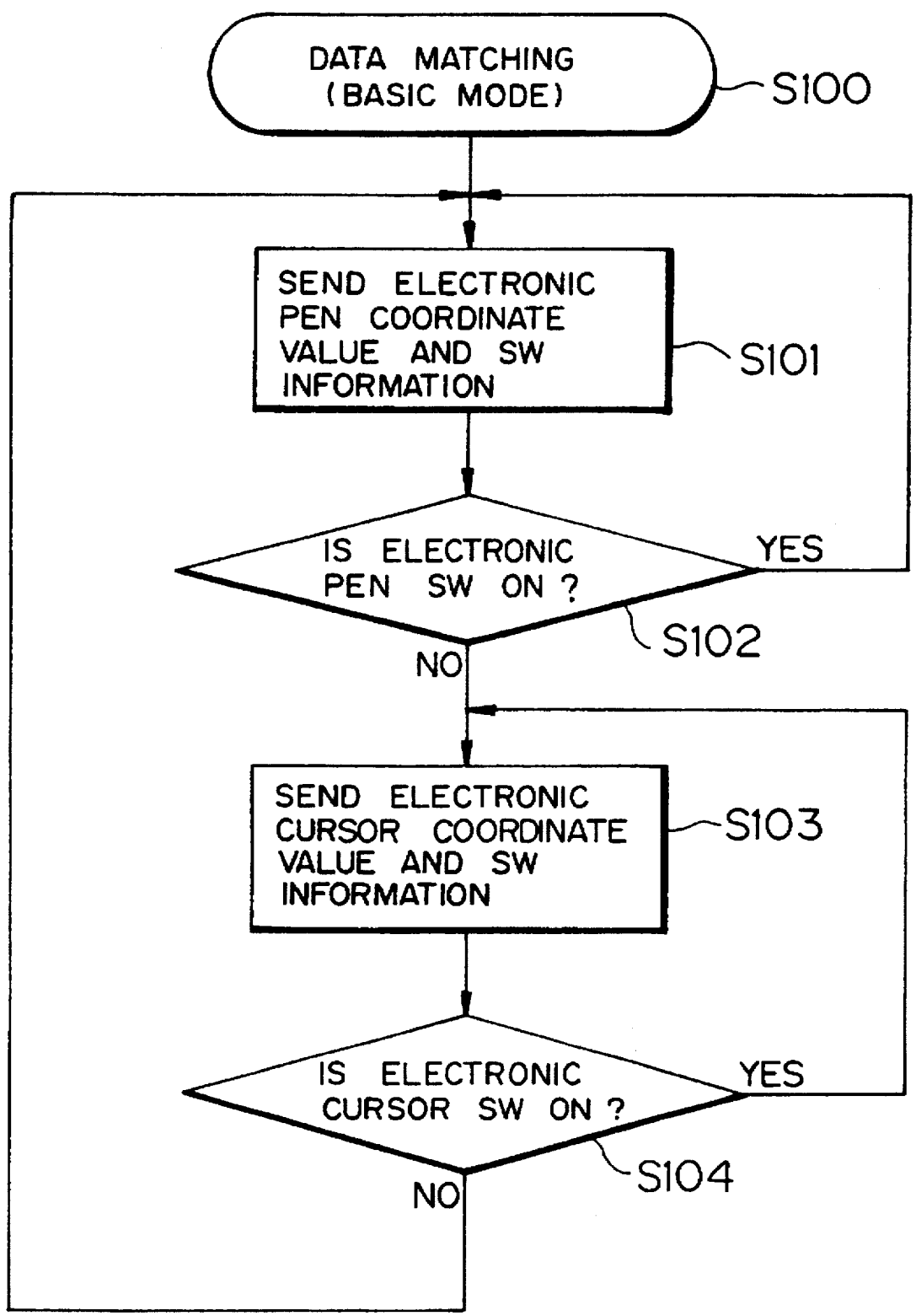
FIG. 4 is a flowchart illustrative of a basic mode of data matching.

FIG. 4 illustrates the flowchart showing the basic mode of the data matching for the illustrated plural pointer arrangement including pen 50 and cursor 60. Determinations are made as to whether the switches (SW) of pen 50 and cursor 60 are ON or OFF. When the basic mode of data matching has been selected (step 100), if both the electronic pen and the electronic cursor are SW=OFF, then the processing of steps 101, 102, 103, and 104 is repeated because the determination results in the steps 102 and 104 are both "NO." Thus, when switches of both pen 50 and cursor 60 are determined to be OFF, i.e., when all of the plural switches are determined to be OFF, the step 101, wherein the coordinate of the electronic pen and the SW information on the electronic pen are sent out, and the step 103, wherein the coordinate of the electronic cursor and the SW information on the electronic cursor are sent out, are repeatedly carried out.

What the above processing means to the application program will now be described with conjunction with FIG. 5.

Figure 5:
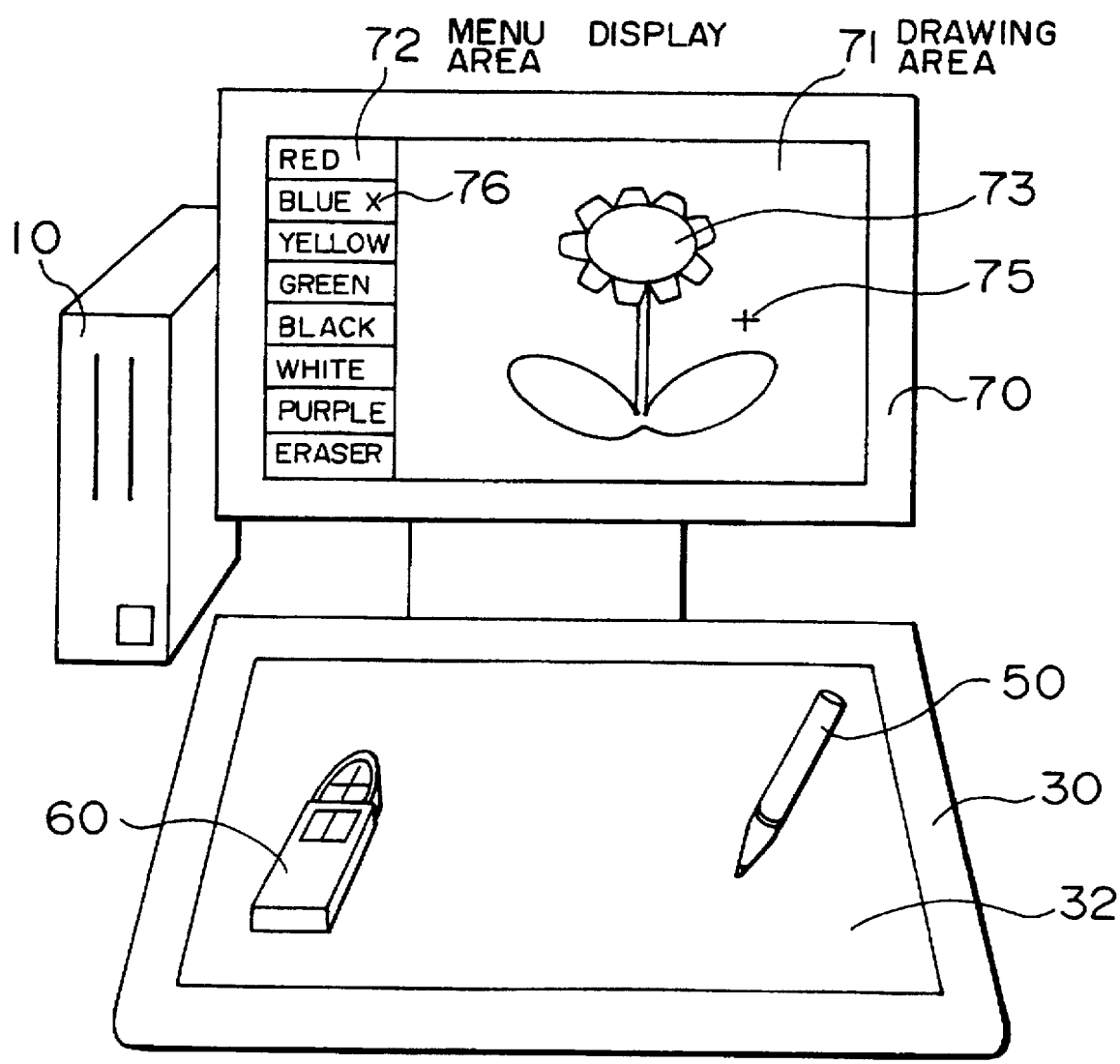
FIG. 5 is an example of the operation of an application wherein the basic mode of data matching is implemented.

FIG. 5 shows an example of the operation of the application program when the basic mode of data matching is implemented. The application program, i.e., the graphic processor in this embodiment, is stored in the computer 10; it displays a pointer or the like on the screen of the display unit 70 in order to receive the information from the coordinate detecting device 30 and carry out interactive input. The electronic pen 50 and the electronic cursor 60 are placed on a coordinate detecting surface 32 of the coordinate detecting device 30 and they move on the coordinate detecting surface 32 as the operator operate them. The hands of the operator are not shown. In the state illustrated in FIG. 5, the position pointed by the electronic pen 50 is the position of a pen pointer 75 in a drawing area 71 on the display screen. The position pointed by the electronic cursor 60 is the position of a cursor pointer 76 in the menu item marked "Blue" in a menu display area 72 on the display screen. When two coordinates are alternately sent out with the switches OFF, the application program alternately carries out the display of the pen pointer 75 and the highlighted display of the menu item pointed by the cursor pointer 76.

A typical application program carries out the above displaying operations relatively fast, so that it appears to the operator's eyes as if the two pointers were displayed at the same time. The same applies even when both the pen pointer 75 and the cursor pointer 76 are in the drawing area 71 or the menu display area 72.

Thus, the typical application program displays two pointers when it receives two coordinates alternately. The application program, however, changes the operation if either switch turns ON. For instance, when the cursor switch is ON and the pen switch is OFF under the condition shown in FIG. 5, if two mixed pieces of information are received, then the switches repeat turning ON and OFF, causing problems: for example, the same menu is repeatedly selected and implemented even though the operator has depressed the switch only once; or in the case of freehand drawing (inking input), the trace of the ink is interrupted or the inking repeatedly shuttles between the two pointers if the switches are fixed to ON.

To avoid the problem, therefore, if either switch turns ON, then the coordinate value of only the one with its switch depressed is transmitted as long as the switch stays ON. This processing is represented by the step 101 and the step 102 which are repeated when the determination result in the step 102 is YES in the flowchart shown in FIG. 4, and the step 103 and the step 104 which are repeated if the determination result in the step 104 is YES. This processing solves most problems which may annoy the application program. The same is true with the pointing input and the inking input because there is no competing coordinate inputs as long as either switch is ON.

The pointing refers to the input of a coordinate value by the operator when the application program urges the operator to enter a coordinate at the time of menu selection. This situation applies to the input of end points in the process of drawing a rectangle, for example, in computer-aided design (CAD) or the like. The inking refers to the input of data comprising a sequence of points in text input by handwriting or the like.

In the flowchart given in FIG. 4, as long as the electronic pen switch stays ON, the steps 101 and 102 are repeated; therefore, the information on the electronic cursor is discarded whether the electronic cursor switch is ON or OFF. Likewise, as long as the electronic cursor switch stays ON, the steps 103 and 104 are repeated; therefore, the information on the electronic pen is discarded whether the electronic pen switch is ON or OFF.

The above operation will be further explained with reference to FIG. 5. The operator is allowed to use the electronic pen 50 and the electronic cursor 60 as independent position pointing devices and use them as if the application program were designed for multiple devices while it is actually designed for a single device, except that the operator is not allowed to turn both switches ON at the same time. Thus, the single device emulation of the digitizer having the multi-device function, i.e., the pseudo multi-device function has been accomplished.

Figure 6:
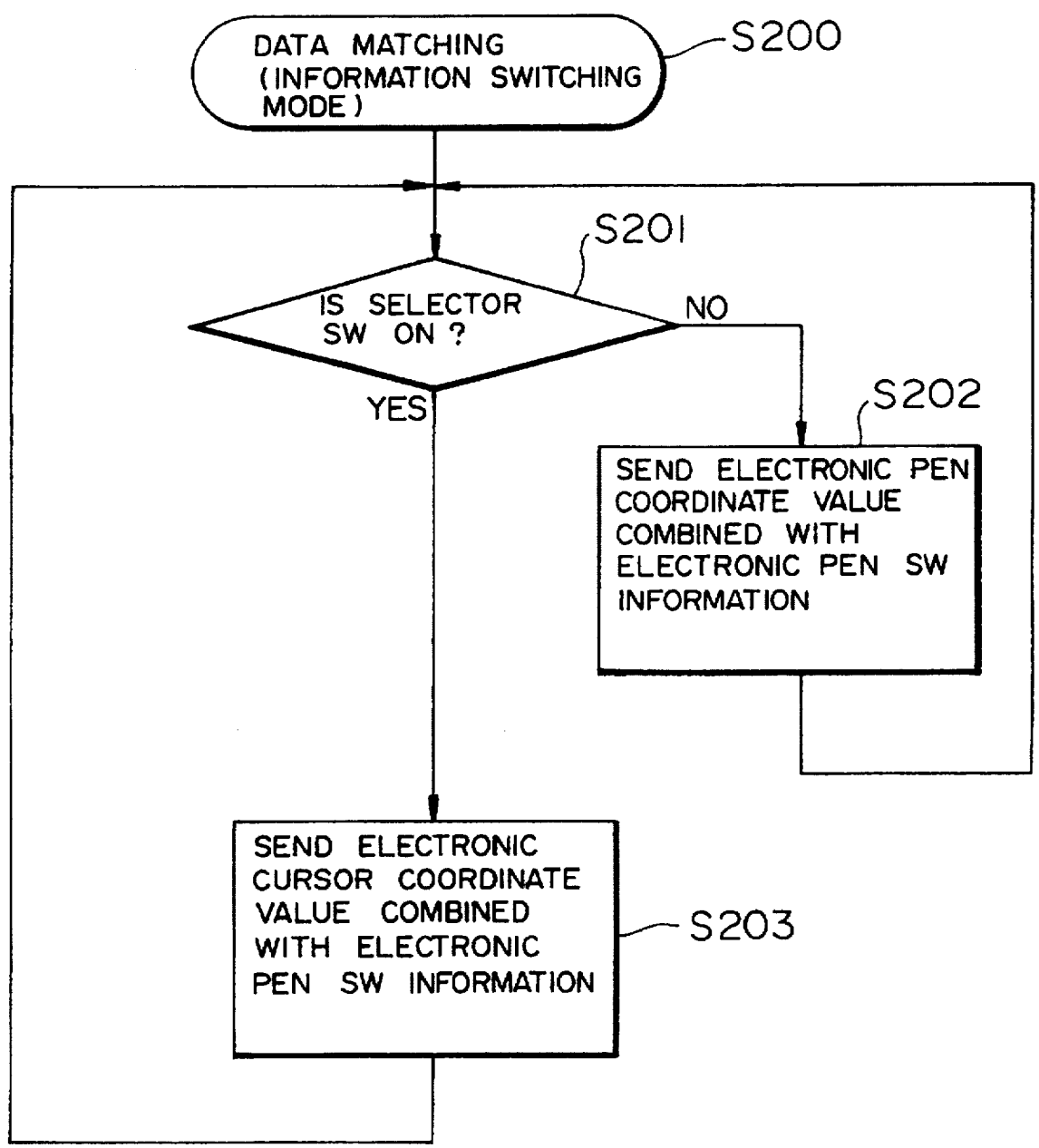
FIG. 6 is a flowchart illustrative of an information switching mode of data matching.

The information switching mode will now be described. FIG. 6 illustrates the flowchart showing the information switching mode of the data matching process.

If the information switching mode is selected by the mode switching operation mentioned above (step 200), then the data matching section decides whether the selector switch is ON or not (step 201). The selector switch can be provided as, for example, the electronic cursor switch; if there are a plurality of buttons, the selector switch may be assigned to one of the buttons. Regardless of the place where the data matching section is provided, the data matching section obtains at least all SW information on the electronic cursor and the electronic pen and therefore it is allowed to obtain the selector switch information regardless of which SW information is handed over to the application program. The steps for obtaining the information are not shown in FIG. 6; it is assumed that the information has been obtained before the step 201.

When the selector switch is OFF, the program combines the coordinate of the electronic pen with the SW information on the electronic pen and sends out the combined information (step 202), then the program goes back to the step 201. As long as the selector switch is OFF, the program repeats the steps 201 and 202.

If the selector switch is turned ON, then the program combines the coordinate of the electronic cursor with the SW information on the electronic pen and sends out the combined information (step 203 rather than sending out the coordinate of the electronic pen. Thus, the selector switch functions to switch between the coordinate of the electronic pen and the coordinate of the electronic cursor. The selector switch cannot be recognized by the application program. The application program recognizes the electronic pen switch in this case and the electronic pen switch functions as the switch working on the application program regardless of which coordinate is transmitted. The combination of the information can be changed for transmission as described above because the data matching section has the multi-device information. As long as the selector switch is ON, the steps 201 and 203 are repeated.

The electronic cursor switch is used for switching the information; therefore, the SW information to be handed over to the application program is always the electronic pen SW information. If the electronic cursor is equipped with two or more switches, then a switch other than the one allocated as the selector switch may be used; such a modified embodiment is also possible. It is generally considered to be laborious to operate two buttons installed on the electronic cursor. For this reason, the information switching mode according to the present invention is designed so that the SW information transferred to the application program is always the one on the electronic pen.

FIG. 7 illustrates an example of the operation of the application program when the information switching mode of data matching is implemented. As in the example described above, the input in the case of a CAD application program is taken as the example.

Figure 7A:
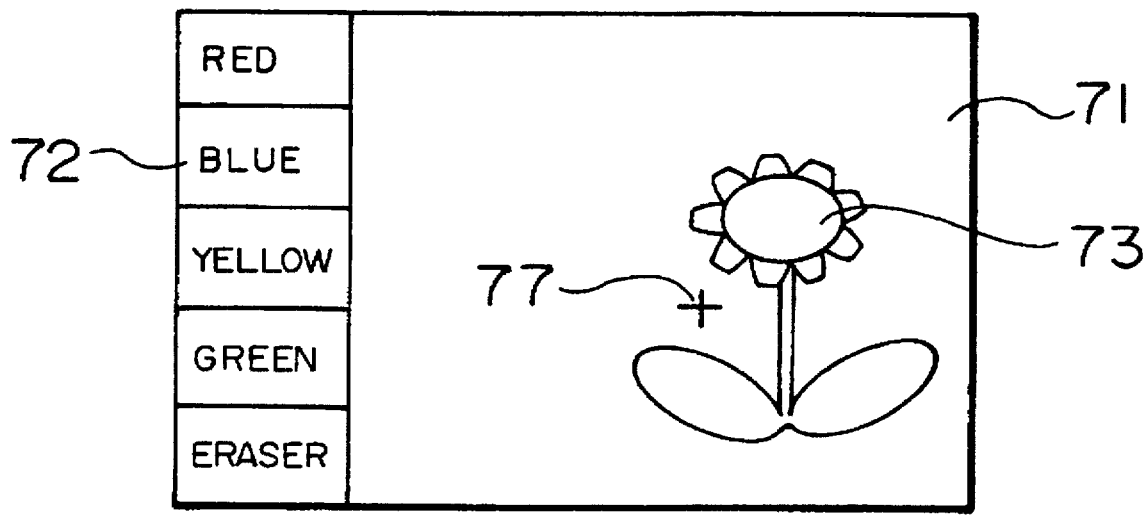
FIGS. 7A and 7B are an example of the operation of an application wherein the information switching mode of data matching is implemented.

FIG. 7(A) shows a state wherein the selector switch is OFF. Of the contents displayed on the screen of the display unit 70, a drawn picture 73 and a pointer 77 which indicates the position of the electronic pen are displayed in the drawing area 71. The pointer which indicates the position of the electronic cursor is not displayed and the menu item corresponding to the position is not highlighted. Under this condition, the system works as if the electronic pen were the only one existing position pointing device.

Figure 7B:
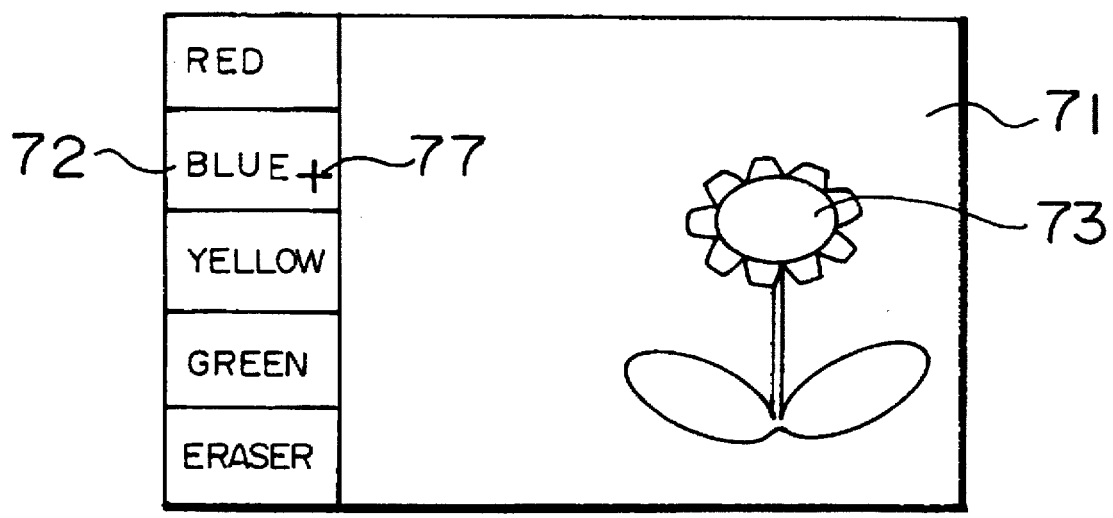

FIG. 7(B) shows a state wherein the selector switch is ON. In this case, no pointer is displayed in the drawing area 71, while the pointer 77 which indicates the position of the electronic cursor is displayed or highlighted in the position of the menu item "Blue" in the menu area 72. When the operator moves the electronic cursor under this condition, the position of the pointer 77 or the position of the corresponding highlighted item changes accordingly. The operator can finalize a selected menu by turning ON the switch of the electronic pen rather than the electronic cursor in the desired position.

In this mode, the pointer based on the coordinate of the electronic pen and the pointer based on the coordinate of the electronic cursor are not displayed at the same time. The pointers, however, are moved instantly when the selector switch is operated; therefore, drawing and menu selection can be done, for example, without moving the position pointing devices much. Thus, effective use of the two position pointing devices can be achieved also in the information switching mode.

Figure 8:
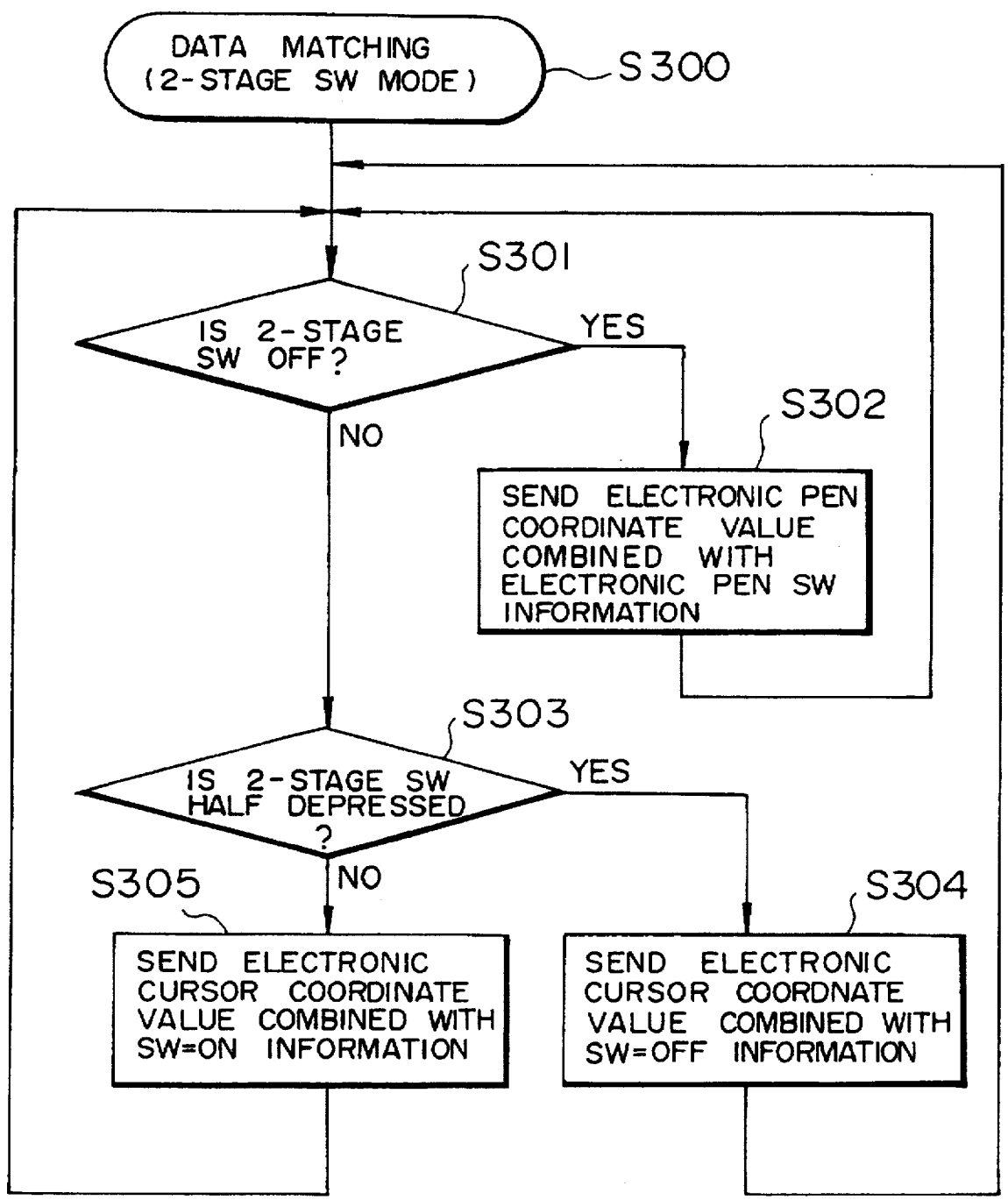
FIG. 8 is a flowchart illustrative of a 2-stage switch mode of data matching.

FIG. 8 shows the flowchart illustrative of the 2-stage SW mode of the data matching process. This processing requires that a switch be provided as the cursor button which permits the detection of a half-depressed state in addition to ON and OFF states, the coordinate detecting device be capable of detecting the states of the switch including the half-depressed state, and the information be transferred to the data matching section (this may alternatively be the passive transfer for producing a state which enables the data matching section to obtain the information).

As a mechanical switch which permits the detection of even the half-depressed state, there is, for example, the shutter switch of an automatic focusing camera. When the shutter switch is half depressed, the camera fixes the focus and when the shutter switch is fully depressed, the shutter is actuated. Such a shutter switch may be used for this purpose. In the digitizer of the UD Series provided by the applicant described above, the mechanical switch having the functions mentioned above can be achieved by assigning slightly different resonance frequencies to the respective switch states and by detecting the frequency differences as phase differences. Or instead of using the mechanical half-depressing switch, a switch which permits the detection of continuous pressing force such as in a switch employing a capacitance-variable capacitor may be provided as one of the cursor buttons, so that the coordinate detecting device detects the continuous pressing force and processing is carried out according to an appropriate threshold value preset for the pressing force. This switch is referred to as the 2-stage switch in the present patent application.

When a data matching 2-stage SW mode is selected (step 300), the program first determines whether the 2-stage SW is OFF (step 301) and if it is OFF, then the program combines the coordinate of the electronic pen with the SW information on the electronic pen and sends them out (step 302). As long as the 2-stage switch stays OFF, the program repeats the step 301 and the step 302. The processing of the step 302 is identical to that of the step 202 in the information switching mode shown in FIG. 6. Hence, under the condition, it looks as if only the electronic pen exists to the operator's eyes. This condition is illustrated in FIG. 7(A).

If the program finds that the 2-stage switch is not OFF, then it determines whether it is half depressed (step 303), and if it finds the switch half depressed, then it combines the coordinate and the SW=OFF information on the electronic cursor and sends them out (step 304). As long as the 2-stage switch stays half depressed, the program repeats the processing of the steps 301, 303, and 304. This means to the application program that, referring to FIG. 7(B), the highlighted portion of the menu, i.e., the selected menu item, can be changed by moving the cursor with the 2-stage switch half depressed.

If the program determines in the step 303 that the 2-stage switch is fully depressed rather than half depressed, then it combines the coordinate and SW=ON information on the electronic cursor and sends them out (step 305). As long as the 2-stage switch stays fully depressed, the program repeats the processing of the steps 301, 302, and 305. This means to the application program that a selected menu is finalized, referring to FIG. 7(B).

Figure 9:
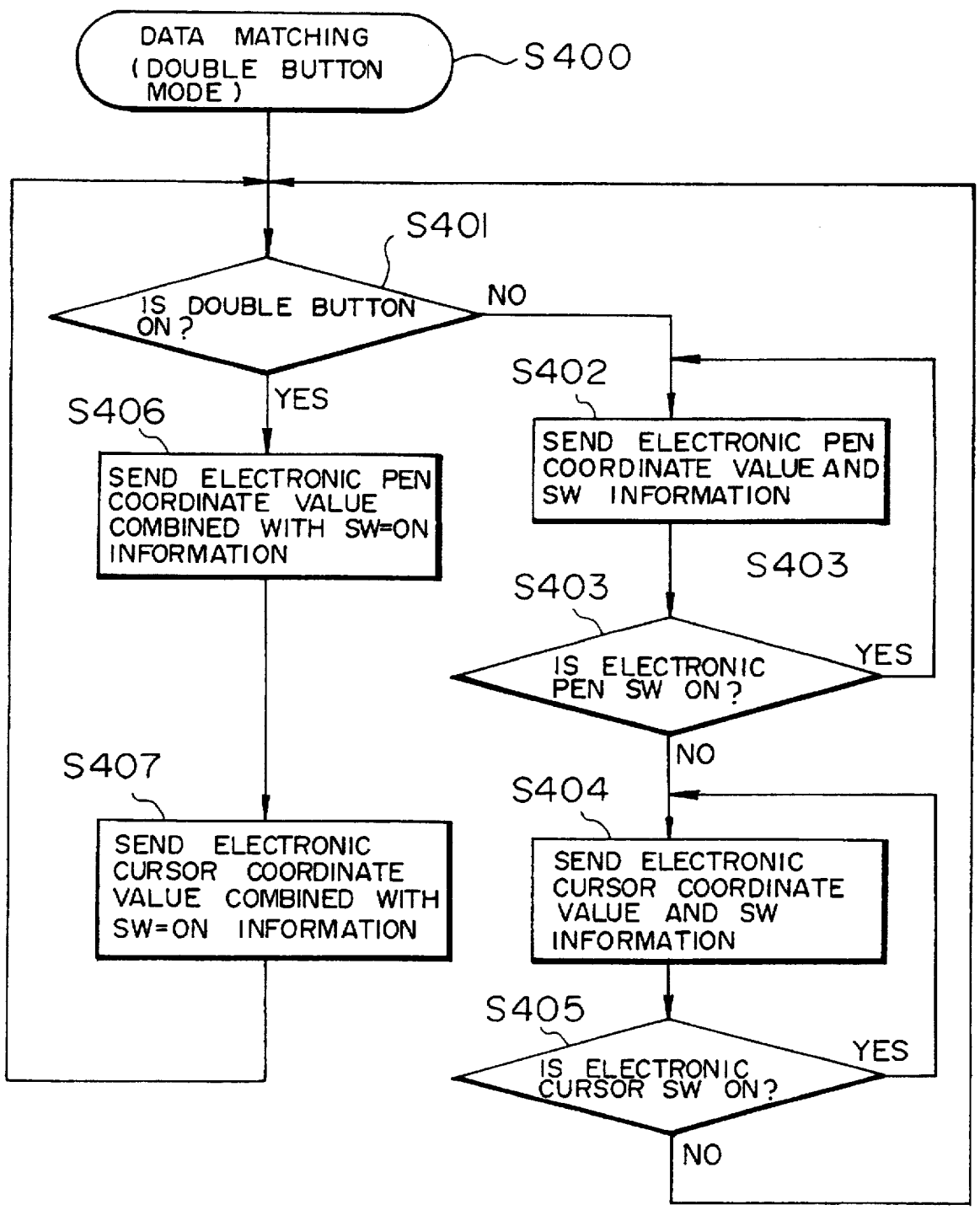
FIG. 9 is a flowchart illustrative of a double button mode of data matching.

The double button mode will now be described, referring to FIG. 9 which shows the flowchart of the double button mode of the data matching process.

In the basic mode, the information switching mode, and the 2-stage SW mode described above, the information on only one position pointing device is sent out as long as the switch is ON, thus permitting both pointing input and inking input (input of a sequence of points required for entering handwritten texts or the like by connecting SW=ON coordinates with lines) are possible. In a fourth mode according to the present invention, namely, the double button mode, is not suited for the inking input but it is ideally used for the pointing input, particularly when the application program needs to hit two points for a 2-point input.

When the double button mode of the data matching process is selected (step 400), the program first determines whether the double button is ON (step 401). The button of or one of the buttons of the cursor is used as the double button. If the double button is OFF, then the program executes the same processing as that in the basic mode of the data matching process (step 402 through step 405), the processing being illustrated by the flowchart of FIG. 4. If any button other than the double button is provided as the cursor button, then the SW information of the step 404 shown in FIG. 9 refers to the information on the switch allocated to that button. It is considered that the double button is not used frequently and usually, therefore, the button of the switch referred to in the step 404 should be provided in an easy-to-reach position and the double button in a less easy-to-reach position.

It is the same as in the basic mode described above in that both the pen pointer and the cursor pointer are displayed at the same time when no switch is depressed and that, when the switch of the electronic pen or the regular switch of the electronic cursor is depressed, the coordinate of only the device of the depressed switch is sent out.

If the double button is depressed when both switches are OFF, then the determination result in the step 401 is YES and the program carries out the processing of a step 406 and a step 407. Specifically, the coordinate combined with the SW=ON information on the electronic pen and the coordinate combined with the SW=ON information on the electronic cursor are transmitted.

The above operation will be described from the aspect of the application program. FIG. 10 shows a typical operation of the application program when the double button mode of the data matching process is implemented. There are cases where the application program requires the input of the coordinates of two points. In the case of a CAD, for example, it is necessary to enter two end points to input a rectangle comprising four sides which are parallel to the X and Y axes. Likewise, when entering a circle, it is necessary to enter two points, namely, the central point and one point on the circumference. Entering a straight line also requires the input of two points. Defining a copying range by specifying the start and end points in the case of a word processor may be regarded as another example of the application program requiring the entry of two points. It is an object of the double button mode to improve the entering efficiency in those cases mentioned above.

Figure 10A:
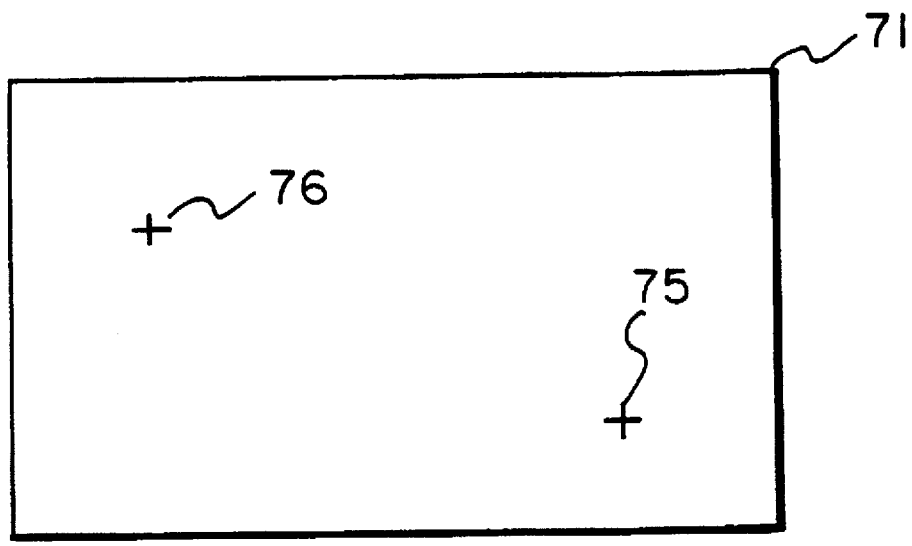
FIGS. 10A and 10B are an example of the operation of an application wherein the basic mode of data matching is implemented.
Figure 10B:
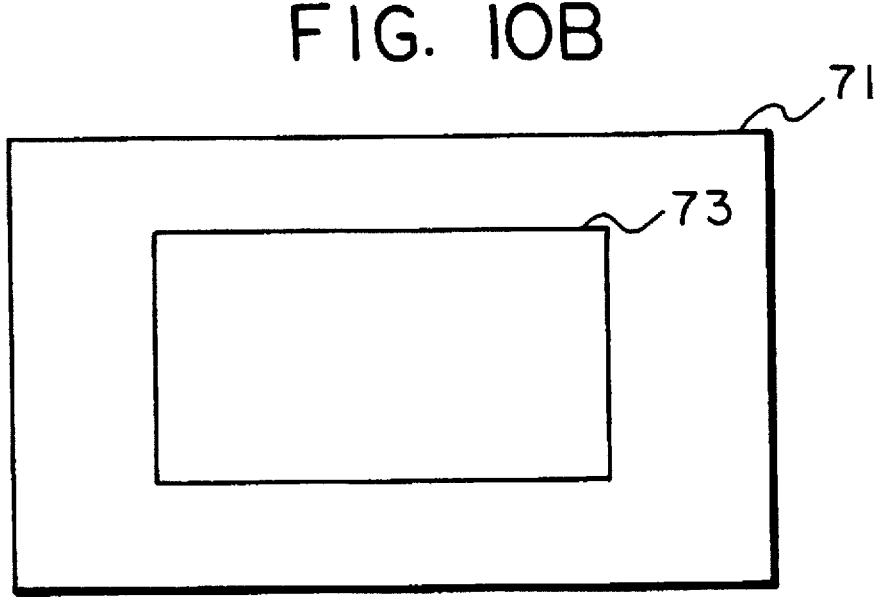

FIG. 10(A) shows a state wherein both the pen pointer 75 and the cursor pointer 76 are displayed in the drawing area 71 at the same time. It is assumed that the application program requires the input of two points, particularly, the menu for entering a rectangle in CAD has been selected. This means that the number of hits required by the application program is two. The "hit" means to enter a coordinate value by receiving the SW=ON information and obtaining the then coordinate value.

Under the condition illustrated in FIG. 10(A), when the double button is depressed for data matching, the coordinate values of the two positions are transmitted together with the SW=ON information. As a result, the application program decides that the two points have been hit and draws a rectangle 73.

A necessary time interval should be allowed between the processing of the step 406 and that of the step 407. When the application program requires two hits, it generally expects manual hits by the operator, and if the interval between the hits is too short, then the application program may fail to recognize them as two hits. In the embodiment where the data matching section is provided in the coordinate detecting device or in the adaptor, it is possible to preset a recognizable time interval when the application program requires the two-point hit, so that the processing of the step S407 is implemented with the preset time interval. If the function of the data matching section is implemented by the tablet driver, then the tablet driver is capable of analyzing each request of the application program and handing a coordinate value over to the application program at an appropriate timing in accordance with the request.

Most application programs are unlikely to pose a problem with repeating the processing of the steps 401, 406, and 407 because, usually, when the number of hits required by the application program is two, any coordinate input made in the drawing area is ignored after two coordinates have been entered and no subsequent operation is enabled until an input is made in the menu area.

What is claimed is:

1. A method of matching data in a coordinate input system which works through cooperative operation between a coordinate detecting device having a multi-device function, which enables the device to detect the coordinate value of and switch information on each of a plurality of position pointing devices even when they are present on a single coordinate detecting surface at the same time, and a tablet driver which receives the information sent from said coordinate detecting device to a computer and hands it over to the application program, the method comprising:

determining whether an information switching switch to which information switching has been assigned among the switches of a plurality of position pointing device in ON, transferring the information only on a first of the position pointing devices among said plurality of position pointing devices to an application program if the information on said information switching switch indicates OFF, and transferring the information only on a second of the position pointing devices among said plurality of position pointing devices to the application program if the information on said information switching switch indicates ON.

2. A coordinate input method for entering the information on a plurality of position pointing devices in an application program compatible with a single device by implementing the data matching method according to claim 1, in a coordinate input system which works through cooperative operation between a coordinate detecting device having a multi-device function, which enables the device to detect the coordinate value of and switch information on each of a plurality of position pointing devices even when they are present on a single coordinate detecting surface at the same time, and a tablet driver which receives the information sent from said coordinate detecting device to a computer and hands it over to the application program.

3. A coordinate input system which works through cooperative operation between a coordinate detecting device having a multi-device function, which enables the device to detect the coordinate value of and switch information on each of a plurality of position pointing devices even when they are present on a single coordinate detecting surface at the same time, and a tablet driver which receives the information sent from said coordinate detecting device to a computer and hands it over to an application program;

said coordinate input system comprising a data matching section which is provided in said coordinate detecting device and which implements the data matching method according to claim 1 in accordance with the coordinate values of and switch information on said plurality of position pointing devices, and transferring an output of said data matching section to the application program via an interface circuit of the coordinate detecting device and an interface circuit of the computer, and the tablet driver.

4. A coordinate input system which works through cooperative operation between a coordinate detecting device having a multi-device function, which enables the device to detect the coordinate value of and switch information on each of a plurality of position pointing devices even when they are present on a single coordinate detecting surface at the same time, and a tablet driver which receives the information sent from said coordinate detecting device to a computer and hands it over to an application program;

said coordinate input system comprising a data matching section which is provided somewhere between an interface of the coordinate detecting device and an interface of the computer and which implements the data matching method according to claim 1 in accordance with the coordinate values of and switch information on said plurality of position pointing devices, and transferring an output of said data matching section to the application program via the tablet driver.

5. A coordinate input system which works through cooperative operation between a coordinate detecting device having a multi-device function, which enables the device to detect the coordinate value of and switch information on each of a plurality of position pointing devices even when they are present on a single coordinate detecting surface, and a tablet driver which receives the information sent from said coordinate detecting device to a computer and hands it over to an application program;

said coordinate input system
comprising a data matching section which is provided in the tablet driver and which implements the data matching method according to claim 1 in accordance with the coordinate values of and switch information on said plurality of position pointing devices, and transferring an output of said data matching section to the application program.

6. A method of matching data in a coordinate input system which works through cooperative operation between a coordinate detecting device having a multi-device function, which enables the device to detect the coordinate value of and switch information on each of a plurality of position pointing devices even when they are present on a single coordinate detecting surface at the same timer and a tablet driver which receives the information sent from said coordinate detecting device to a computer and hands it over to the application program, the method comprising determining whether an information switching switch to which information switching has been assigned among the switches of a plurality of position pointing devices in ON, transferring the information only on a first of the position pointing devices which does not have the information switching switch, to an application program if the information on said information switching switch indicate OFF, and combining the coordinate value of one of the position pointing devices provided with said information switching switch and the switch information on said first position pointing device and handing them over to the application program if the information on said information switching switch indicates ON.

7. A coordinate input method for entering the information on a plurality of position pointing devices in an application program compatible with a single device by implementing the data matching method according to claim 6, in a coordinate input system which works through cooperative operation between a coordinate detecting device having a multi-device function, which enables the device to detect the coordinate value of and switch information on each of a plurality of position pointing devices even when they are present on a single coordinate detecting surface at the same time, and a tablet driver which receives the information sent from said coordinate detecting device to a computer and hands it over to the application program.

8. A coordinate input system which works through cooperative operation between a coordinate detecting device having a multi-device function, which enables the device to detect the coordinate value of and switch information on each of a plurality of position pointing devices even when they are present on a single coordinate detecting surface at the same time, and a tablet driver which receives the information sent from said coordinate detecting device to a computer and hands it over to an application program;

said coordinate input system
comprising a data matching section which is provided in said coordinate detecting device and which implements the data matching method according to claim 6 in accordance with the coordinate values of and switch information on said plurality of position pointing devices, and transferring an output of said data matching section to the application program via an interface circuit of the coordinate detecting device and an interface circuit of the computer, and the tablet driver.

9. A coordinate input system which works through cooperative operation between a coordinate detecting device having a multi-device function, which enables the device to detect the coordinate value of and switch information on each of a plurality of position pointing devices even when they are present on a single coordinate detecting surface at the same time, and a tablet driver which receives the information sent from said coordinate detecting device to a computer and hands it over to an application program;

said coordinate input system
comprising a data matching section which is provided somewhere between an interface of the coordinate detecting device and an interface of the computer and which implements the data matching method according to claim 6 in accordance with the coordinate values of and switch information on said plurality of position pointing devices, and transferring an output of said data matching section to the application program via the tablet driver.

10. A coordinate input system which works through cooperative operation between a coordinate detecting device having a multi-device function, which enables the device to detect the coordinate value of and switch information on each of a plurality of position pointing devices even when they are present on a single coordinate detecting surface, and a tablet driver which receives the information sent from said coordinate detecting device to a computer and hands it over to an application program;

said coordinate input system
comprising a data matching section which is provided in the tablet driver and which implements the data matching method according to claim 6 in accordance with the coordinate values of and switch information on said plurality of position pointing devices, and transferring an output of said data matching section to the application program.

11. A method of matching data in a coordinate input system which works through cooperative operation between a coordinate detecting device having a multi-device function, which enables the device to detect information including a coordinate value of each of a plurality of position pointing devices even when they are present on a single coordinate detecting surface at the same time, and a tablet driver which receives the information sent from said coordinate detecting device to a computer and hands it over to the application program, the method comprising determining whether a 2-stage switch which is provided as one of the switches of a plurality of position pointing devices and which permits detection of half depression and full depression is OFF, transferring the information only a first of the position pointing devices which does not have the 2-stage switch among the plurality of position pointing devices to the application program if said 2-stage switch is OFF, combining the coordinate value of a second of the position pointing devices having the 2-stage switch among said plurality of position pointing devices with the information indicating that the switch is OFF and transferring them to the application program if said 2-stage switch is half depressed, and combining the coordinate value of said second position pointing device and the information indicating that the switch is ON, and transferring the combined coordinate value of said second position pointing device and the information indicating that the switch is ON to the application program if said 2-stage switch is fully depressed.

12. A coordinate input method for entering the information on a plurality of position pointing devices in an application program compatible with a single device by implementing the data matching method according to claim 11, in a coordinate input system which works through cooperative operation between a coordinate detecting device having a multi-device function, which enables the device to detect the coordinate value of and switch information on each of a plurality of position pointing devices even when they are present on a single coordinate detecting surface at the same time, and a tablet driver which receives the information sent from said coordinate detecting device to a computer and hands it over to the application program.

13. A coordinate input system which works through cooperative operation between a coordinate detecting device having a multi-device function, which enables the device to detect the coordinate value of and switch information on each of a plurality of position pointing devices even when they are present on a single coordinate detecting surface at the same time, and a tablet driver which receives the information sent from said coordinate detecting device to a computer and hands it over to an application program;

said coordinate input system comprising a data matching section which is provided in said coordinate detecting device and which implements the data matching method according to claim 11 in accordance with the coordinate values of and switch information on said plurality of position pointing devices, and transferring an output of said data matching section to the application program via an interface circuit of the coordinate detecting device and an interface circuit of the computer, and the tablet driver.

14. A coordinate input system which works through cooperative operation between a coordinate detecting device having a multi-device function, which enables the device to detect the coordinate value of and switch information on each of a plurality of position pointing devices even when they are present on a single coordinate detecting surface at the same time, and a tablet driver which receives the information sent from said coordinate detecting device to a computer and hands it over to an application program;

said coordinate input system comprising a data matching section which is provided somewhere between an interface of the coordinate detecting device and an interface of the computer and which implements the data matching method according to claim 11 in accordance with the coordinate values of and switch information on said plurality of position pointing devices, and transferring an output of said data matching section to the application program via the tablet driver.

15. A coordinate input system which works through cooperative operation between a coordinate detecting device having a multi-device function, which enables the device to detect the coordinate value of and switch information on each of a plurality of position pointing devices even when they are present on a single coordinate detecting surface, and a tablet driver which receives the information sent from said coordinate detecting device to a computer and hands it over to an application program;

said coordinate input system comprising a data matching section which is provided in the tablet driver and which implements the data matching method according to claim 11 in accordance with the coordinate values of and switch information on said plurality of position pointing devices, and transferring an output of said data matching section to the application program.

16. A method of matching data in a coordinate input system which works through cooperative operation between a coordinate detecting device having a multi-device function, the multi-device function enabling the device to detect the coordinate value of operator controlled switch information on each of a plurality of position pointing devices while the position pointing devices are present on a single coordinate detecting surface at the same time, and a tablet driver for receiving the information sent from said coordinate detecting device to a computer and handing it over to an application program, the method comprising:

determining whether a switch on each of the plural position pointing devices is ON, transferring coordinate value and switch information about said plural position pointing devices to the application program if all of said plural switches are determined to be simultaneously OFF, and if any of said switches are determined to be ON, transferring to the application program only information about the position pointing devices having switches determined to be ON.

17. A coordinate input method for entering the information on a plurality of position pointing devices in an application program compatible with a single device by implementing the data matching method according to claim 16, in a coordinate input system which works through cooperative operation between a coordinate detecting device having a multi-device function, which enables the device to detect the coordinate value of and switch information on each of a plurality of position pointing devices even when they are present on a single coordinate detecting surface at the same time, and a tablet driver which receives the information sent from said coordinate detecting device to a computer and hands it over to the application program.

18. A coordinate input system which works through cooperative operation between a coordinate detecting device having a multi-device function, which enables the device to detect the coordinate value of and switch information on each of a plurality of position pointing devices even when they are present on a single coordinate detecting surface at the same time, and a tablet driver which receives the information sent from said coordinate detecting device to a computer and hands it over to an application program;

said coordinate input system comprising a data matching section which is provided in said coordinate detecting device and which implements the data matching method according to claim 16 in accordance with the coordinate values of and switch information on said plurality of position pointing devices, and transferring an output of said data matching section to the application program via an interface circuit of the coordinate detecting device and an interface circuit of the computer, and the tablet driver.

19. A coordinate input system which works through cooperative operation between a coordinate detecting device having a multi-device function, which enables the device to detect the coordinate value of and switch information on each of a plurality of position pointing devices even when they are present on a single coordinate detecting surface at the same time, and a tablet driver which receives the information sent from said coordinate detecting device to a computer and hands it over to an application program;

said coordinate input system comprising a data matching section which is provided somewhere between an interface of the coordinate detecting device and an interface of the computer and which implements the data matching method according to claim 16 in accordance with the coordinate values of and switch information on said plurality of position pointing devices, and transferring an output of said data matching section to the application program via the tablet driver.

20. A coordinate input system which works through cooperative operation between a coordinate detecting device having a multi-device function, which enables the device to detect the coordinate value of and switch information on each of a plurality of position pointing devices even when they are present on a single coordinate detecting surface, and a tablet driver which receives the information sent from said coordinate detecting device to a computer and hands it over to an application program;

said coordinate input system comprising a data matching section which is provided in the tablet driver and which implements the data matching method according to claim 16 in accordance with the coordinate values of and switch information on said plurality of position pointing devices, and transferring an output of said data matching section to the application program.

21. A method of matching data in a coordinate input system which works through cooperative operation between a coordinate detecting device having a multi-device function, the multi-device function enabling the device to detect the coordinate value of operator controlled switch information on each of a plurality of position pointing devices while the position pointing devices are present on a single coordinate detecting surface at the same time, and a tablet driver for receiving the information sent from said coordinate detecting device to a computer and handing it over to an application program, the method comprising:

determining whether a double button of one switch of the plural position pointing devices is ON, implementing the method of claim 16 if said double button is determined to be OFF, or if said double button of a first of said plural position pointing devices is determined to be ON, combining the coordinate value of the first pointing device with information indicating that the switch of the first pointing device is detected as ON and transferring the combined coordinate value and the determined ON switch information of the first pointing device to the application program, and combining the coordinate value of a second of said plural position pointing devices with information indicating that the switch of the second pointing device is detected as ON, and transferring the combined coordinate value and the determined ON switch information of the second pointing device to the application program.

* * * * *